US011472305B2

(12) United States Patent
Pfeilschifter et al.

(10) Patent No.: US 11,472,305 B2
(45) Date of Patent: *Oct. 18, 2022

(54) CHARGING CIRCUIT FOR A VEHICLE-SIDE ELECTRICAL ENERGY STORE

(71) Applicant: Vitesco Technologies GmbH, Hannover (DE)

(72) Inventors: Franz Pfeilschifter, Munich (DE); Martin Götzenberger, Munich (DE); Manuel Brunner, Munich (DE)

(73) Assignee: VITESCO TECHNOLOGIES GMBH, Hannover (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/278,620

(22) PCT Filed: Sep. 17, 2019

(86) PCT No.: PCT/EP2019/074851
§ 371 (c)(1),
(2) Date: Mar. 22, 2021

(87) PCT Pub. No.: WO2020/064432
PCT Pub. Date: Apr. 2, 2020

(65) Prior Publication Data
US 2022/0041074 A1 Feb. 10, 2022

(30) Foreign Application Priority Data
Sep. 24, 2018 (DE) ...................... 10 2018 216 236.0

(51) Int. Cl.
*B60L 53/22* (2019.01)
*H02J 7/02* (2016.01)

(52) U.S. Cl.
CPC ................ *B60L 53/22* (2019.02); *H02J 7/02* (2013.01); *H02J 2207/20* (2020.01)

(58) Field of Classification Search
CPC ........ B60L 53/22; B60L 2210/30; H02J 7/02; H02J 2207/20; Y02T 10/70; Y02T 10/7072; Y02T 10/72; Y02T 90/14
(Continued)

(56) References Cited

U.S. PATENT DOCUMENTS

2007/0165433 A1   7/2007   Katooka ..................... 363/142
2012/0087163 A1   4/2012   Morimoto ..................... 363/71
(Continued)

FOREIGN PATENT DOCUMENTS

DE   10 2017 208 360   2/2018   ................ H02J 7/02
EP   2 541 755          1/2013   ................ H02P 5/74

OTHER PUBLICATIONS

Search Report for International Application No. PCT/EP2019/074851, 12 pages, dated Nov. 25, 2019.
(Continued)

*Primary Examiner* — Paul Dinh
(74) *Attorney, Agent, or Firm* — Slayden Grubert Beard PLLC

(57) ABSTRACT

Various embodiments include a charging circuit for a vehicle-side electrical energy store comprising: an alternating current terminal; at least two smoothing capacitors; a configuration device; and a rectifier via which the alternating current terminal is connected to the configuration device. The configuration device connects the rectifier to the at least two smoothing capacitors and is configured to connect the smoothing capacitors to one another in a first parallel arrangement and a second series arrangement. The alternating current terminal comprises a neutral conductor terminal connected via a diode circuit to the configuration device.

11 Claims, 1 Drawing Sheet

(58) Field of Classification Search
USPC .......................................................... 320/109
See application file for complete search history.

(56) References Cited

U.S. PATENT DOCUMENTS

| | | | |
|---|---|---|---|
| 2018/0041061 A1 | 2/2018 | McLaughlin | H02J 7/0055 |
| 2018/0162229 A1 | 6/2018 | Götz | B60L 11/1812 |
| 2021/0016672 A1* | 1/2021 | Zhu | B60L 53/22 |
| 2021/0091573 A1* | 3/2021 | Takamatsu | B60L 53/24 |

OTHER PUBLICATIONS

Office Action for DE Application No. 10 2018 216 236.0, 4 pages, dated Aug. 5, 2019.

* cited by examiner

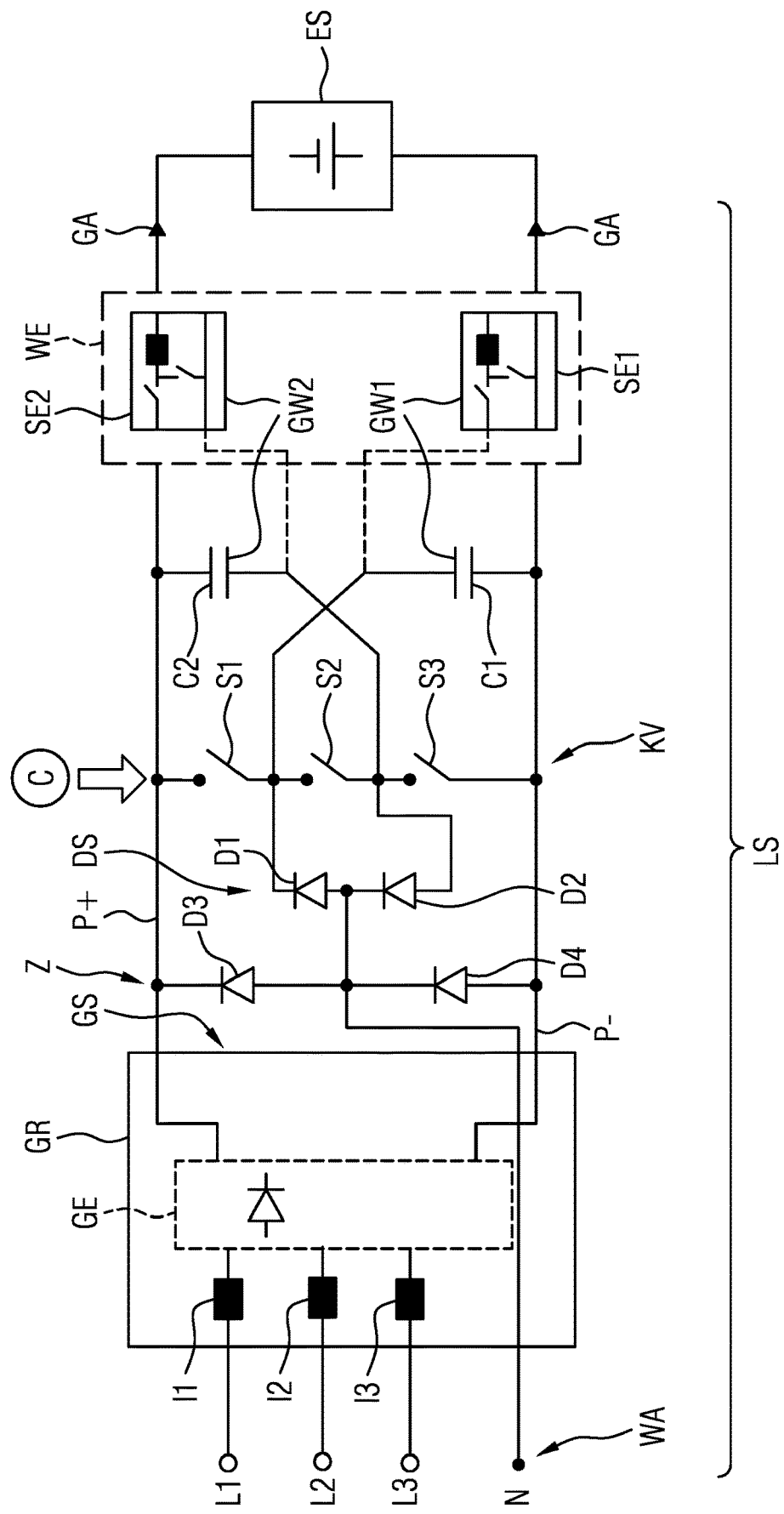

CHARGING CIRCUIT FOR A VEHICLE-SIDE ELECTRICAL ENERGY STORE

CROSS-REFERENCE TO RELATED APPLICATIONS

This application is a U.S. National Stage Application of International Application No. PCT/EP2019/074851 filed Sep. 17, 2019, which designates the United States of America, and claims priority to DE Application No. 10 2018 216 236.0 filed Sep. 24, 2018, the contents of which are hereby incorporated by reference in their entirety.

TECHNICAL FIELD

The present disclosure relates to vehicles. Various embodiments of the teachings herein may include charging circuits for a vehicle-side electrical energy store and/or vehicles with an electric drive.

BACKGROUND

Vehicles with an electric drive, including both vehicles that have purely electrical drive and hybrid vehicles, have an electrical energy store, in particular in the form of an accumulator. In order to charge said store with external means some vehicles of this type have an alternating current connection. This alternating current connection is provided in order to use energy from an AC grid, such as a public supply grid, for charging the vehicle. Vehicles of this sort are also referred to as "plug-in vehicles".

On one hand the energy store must, for technical reasons, be charged with DC voltage, so that rectification is required, and on the other hand adjustments between the operating or rated voltage of the energy store on the one hand and the level of the alternating voltage, or of the rectified voltage generated therefrom, may be necessary. It is furthermore desirable for it to be possible to charge the energy store of the vehicle equally well with single-phase or with polyphase alternating voltage, in order to be able to realize the shorter charging time enabled through the higher interlinking factor of three-phase current.

In addition to these requirements, the costs for semiconductors and other components for corresponding charging circuits that are suitable, both from the point of view of current-carrying capacity and of voltage rating, must be considered. In the light, in particular, of these costs, the task is to indicate a possible way in which an energy store of a vehicle can be charged using economical components.

SUMMARY

As an example, some embodiments of the teachings herein include a charging circuit (LS) for a vehicle-side electrical energy store (ES), wherein the charging circuit comprises: an alternating current terminal (WA), at least two smoothing capacitors (C1, C2), a configuration device (KV) and a rectifier (GR) via which the alternating current terminal (WA) is connected to the configuration device (KV), wherein the configuration device (KV) connects the rectifier (GR) to the smoothing capacitors (C1, C2), and is configured to connect the smoothing capacitors (C1, C2) to one another optionally in a parallel or series configuration, wherein the alternating current terminal comprises a neutral conductor terminal (N) that is connected via a diode circuit (DS) to the configuration device (KV).

In some embodiments, the diode circuit (DS) is designed as a rectifier circuit that comprises an alternating current side that is connected to the neutral conductor terminal (N), and that comprises a direct current side that is connected to the configuration device (KV).

In some embodiments, the diode circuit (DS) comprises at least two diodes (D1, D2), of which at least a first diode (D1) connects the neutral conductor terminal (N) to a first of the smoothing capacitors (C1), and of which at least a second diode (D2) connects the neutral conductor terminal (N) to a second of the smoothing capacitors (C2).

In some embodiments, the configuration device (KV) comprises at least one first switch (S1, S3) that is provided in the configuration device (KV) in such a way that when closed it connects the smoothing capacitors (C1, C2) to one another in parallel, and the configuration device (KV) comprises at least one second switch (S2) that is provided in the configuration device (KV) in such a way that when closed it connects the smoothing capacitors (C1, C2) to one another in series.

In some embodiments, the configuration device (KV) comprises two first switches (S1, S3) and a second switch (S2) that are connected to one another in a series circuit that is connected to different potentials (P+, P−) of the rectifier (GR), wherein the first switches (S1, S3) are connected to one another within the series circuit via the second switch.

In some embodiments, there is an additional diode circuit (Z) via which the neutral conductor terminal (N) is connected to different potentials of the rectifier (GR).

In some embodiments, there is a control apparatus (C) that is connected in a controlling manner to the configuration device (KV), wherein the configuration device (KV) is fitted with switches (S1-S3), and the control apparatus (C) is designed (i) in a parallel configuration state, to close only the switch or switches (S1, S3) of the configuration device (KV) via which the smoothing capacitors (C1, C2) are each connected between two different potentials (P+, P−) of the rectifier (GR), and (ii) in a series configuration state, to close only the switch or switches (S2) of the configuration device (KV) that connect the smoothing capacitors (C1, C2) in series.

In some embodiments, the control apparatus (C) is designed to ascertain a single-phase as well as a polyphase occupancy state of the alternating current terminal (WA), to ascertain a single-phase as well as a polyphase usage state of the rectifier (GR), or to acquire a signal that indicates a single-phase or polyphase desired state of the charging circuit, wherein the control apparatus (C) is designed to connect the smoothing capacitors (C1, C2) to one another in a parallel configuration in one of the single-phase states, and to connect them to one another in a series configuration in one of the polyphase states.

In some embodiments, the charging circuit comprises a plurality of direct voltage converters (GW1, GW2), each of which comprises a clocked switching unit (SE1, SE2) and an intermediate circuit capacitor, wherein the intermediate circuit capacitor of a first of the direct voltage converters (GW1) is formed of a first of the smoothing capacitors (C1), and the intermediate circuit capacitor of a second of the direct voltage converters (GW2) is formed of a second of the smoothing capacitors (C2).

In some embodiments, the direct voltage converters (GW1, GW2) comprise terminals that are connected to a direct current terminal (GA) configured for connection of the energy store (ES), wherein the terminals of the direct voltage converters (GW1, GW2) are connected to one another in parallel.

In some embodiments, the rectifier (GR) is a controllable rectifier that comprises a controllable rectifier unit (GE) that is connected directly to the alternating current terminal (WA), or wherein the rectifier (GR) is a power factor correction filter that comprises a controllable rectifier unit (GE) that is connected via inductors (I1-I3) to the alternating current terminal (WA).

BRIEF DESCRIPTION OF THE DRAWING

The FIG. shows one embodiment of a charging circuit that is connected to a (vehicle-side) energy store, incorporating teachings of the present disclosure.

DETAILED DESCRIPTION

In some embodiments, a charging circuit comprises two smoothing capacitors that can be connected to each other optionally in parallel or in series by means of a configuration device. A rectifier is connected to the alternating current terminal and so connects the alternating current terminal to the smoothing capacitors (with rectification). The alternating current terminal, and thereby also the rectifier, can be operated with different numbers of (various) phases, for example single-phase or three-phase. Different interlinking factors (which depend, as is known, directly on the number of phases, i.e. the number of currents, offset in phase to one another, that are used) thus result. As a consequence, due to the different interlinking factors, different voltage levels also result at the smoothing capacitors when the rectifier, or the alternating current terminal, is operated with different numbers of phases.

Due to the optionally parallel or series configuration of the smoothing capacitors, the smoothing capacitors may be configured economically (namely with a relatively low rated voltage), and nevertheless adjust and thereby optimize them depending on the voltage to be smoothed or the operation of the rectifier. In the case of single-phase voltage, which means with single-phase operation (corresponding to a low rectified voltage), a parallel configuration is provided in order in this way to achieve a high capacitance, whereas in the case of polyphase operation (of the alternating current terminal or of the rectifier) and thereby a (rectified) voltage that is greater in comparison to single-phase operation, the serial configuration may be used, so that each capacitor is only subjected to a part of the total voltage for smoothing.

In some embodiments, a diode circuit is provided in order to connect the neutral conductor of the alternating current terminal appropriately to each configuration. The neutral conductor terminal of the alternating current terminal is connected to the configuration device through this. The configuration device itself connects the rectifier to the smoothing capacitors and is thus connected to the smoothing capacitors. In polyphase operation, the diode circuit enables asymmetric components of the phases of the alternating current terminal to be diverted, and thus serves for filtering. In polyphase operation, or in the serial configuration, the diode circuit thus serves to divert unwanted components.

In asymmetric operation, which means, for example, in single-phase operation, the diode circuit serves to connect the neutral conductor as a diverter or as a return conductor. While one, a plurality, or all of the phase terminals of the alternating current terminal are subjected to one phase, or with the same phase, of the alternating current system, the neutral conductor forms the return conductor, as in usual, single-phase consumers of a 230 V alternating current grid. The diodes of the diode circuit thereby permit a connection to the (parallel) connected smoothing capacitors, in order to complete the return conduction path (or forward conduction path) to these. The diode circuit comprises at least one diode that is provided between the neutral conductor terminal and the configuration device. The diode circuit in particular comprises for this purpose at least one diode connected in series (wherein the series circuit relates to the interconnection relative to the neutral conductor terminal). The diode circuit can comprise a plurality of diodes that are connected in series starting from the neutral conductor terminal to the configuration device. In some embodiments, at least two diodes are connected (in series), relative to the neutral conductor terminal, in opposing directions between the neutral conductor terminal and the configuration device in this case.

The connection of the neutral conductor terminal via the diode circuit referred to above enables the division of the smoothing capacitors, in particular so that even at high voltages it is possible to work with capacitors whose maximum voltage is lower than the maximum rectified voltage. Through division into a series circuit, the individual smoothing capacitors are only subject to a portion of the rectified voltage. The smoothing capacitors can thereby be dimensioned for a lower rated voltage or maximum voltage, whereby costs can be saved. The diode circuit enables the neutral conductor terminal to be connected without switches. In the case of polyphase use of the alternating current terminal or of the rectifier, the connection serves for the diversion of asymmetric components, whereas, in a single-phase operation (of the alternating current terminal or of the rectifier), the diode circuit serves to provide a connection between the configuration device (and thereby, finally, an energy storage terminal) and the single-phase potential.

A charging circuit for a vehicle-side electrical energy store may include an alternating current terminal, at least two smoothing capacitors, a configuration device and a rectifier. The alternating current terminal is connected to the configuration device via the rectifier. The configuration device connects the rectifier to the smoothing capacitors. The configuration device is, in other words, provided between the rectifier and the smoothing capacitors. The rectifier is thus connected to the smoothing capacitors via the configuration device. The configuration device is configured to connect the smoothing capacitors to one another optionally in a parallel or series configuration. The smoothing capacitors are thus connected to the configuration device in such a way that in a first switch state the smoothing capacitors are connected in parallel with one another, and in a second state (corresponding to the series configuration) they are connected to one another in series.

In some embodiments, the alternating current terminal comprises a neutral conductor terminal. This is connected via a diode circuit to the configuration device. The neutral conductor terminal is thus connected to the smoothing capacitors via the diode circuit. The configuration device is provided between the neutral conductor terminal and the smoothing capacitors.

In some embodiments, the diode circuit comprises a plurality of diodes. These are connected (possibly with switches to one another) to different connection points of the configuration device. One, a plurality, or all of the diodes of the diode circuit is or are connected to the neutral conductor terminal. This at least one diode is connected in series between the neutral conductor terminal and the configuration device, in particular to connecting points within the configuration device.

In some embodiments, the diode circuit is designed as a rectifier circuit. The diode circuit can here comprise a diode bridge circuit, perhaps in the form of a half-bridge, that can comprise an intermediate point at which the neutral conductor is connected. The rectifier circuit that is formed by the diode circuit can comprise an alternating current side, perhaps in the form of the connecting point. This alternating current side is connected to the neutral conductor terminal. The rectifier circuit formed by the diode circuit can comprise a direct current side that is connected to the configuration device (and thereby also to the capacitors). The rectifier circuit is, in particular, a full-wave rectifier circuit.

In some embodiments, the diode circuit can comprise at least two diodes. The different diodes may be connected to different smoothing capacitors. With reference to the neutral conductor terminal, the different diodes are connected in opposing directions (with reference to the forward conduction direction or the reverse bias direction). A first diode of the two diodes can connect the neutral conductor terminal to a first of the smoothing capacitors. A second diode of the at least two diodes can connect the neutral conductor terminal to a second of the smoothing capacitors. As seen from the neutral conductor terminal, the forward conduction directions of the two diodes are opposed to one another. Both half-waves are thereby conducted by the diodes, wherein the different diodes conduct half-waves of different polarities (to the capacitors). The connection between the smoothing capacitors and the diodes yields a series interconnection of the respective diode to the smoothing capacitor. This allows a particularly economical representation of the diode circuit that is equally well designed for single-phase and for polyphase charging.

In some embodiments, the configuration device comprises at least one first switch. When closed, this connects the smoothing capacitors to one another in parallel. The at least one first switch therefore establishes the parallel connection between the smoothing capacitors. In some embodiments, the configuration device can comprise at least one second switch that (when closed) connects the smoothing capacitors to one another in series. In the closed state, the at least one second switch thus connects the smoothing capacitors to one another in series.

In some embodiments, the configuration device comprises two first switches and a second switch. The two first switches can also be referred to as parallel switching elements, since, when closed, they connect the smoothing capacitors to one another in a parallel circuit. The configuration device can, furthermore, comprise a second switch that can also be referred to as the serial switching element, since, when closed, it connects the smoothing capacitors to one another in series. The two first switches and the one second switch (in other words the two parallel switching elements and the series switching element) are connected to one another in series, in particular in a series circuit. This series circuit is connected to different potentials of the rectifier. In other words, the two first switches and the second switch are connected to one another in a series circuit that is connected in parallel with the rectifier. The switches are connected to one another in a series circuit that is connected to different potentials of the rectifier.

In some embodiments, the first switches are connected to one another, in the context of the series circuit, via the second switch. The first switches thus comprise terminals that are connected directly to the different potentials of the rectifier. In this context, potentials of the rectifier refer to direct voltage potentials, which means on the direct voltage side of the rectifier. The second switch connects the two first switches to one another. Since the second switch is connected between the first switches, and the first switches are connected directly to the two potentials, the second switch is not connected to the potentials directly, but via the first switches. The potentials of the rectifier correspond to the rectified voltage that results from the voltage at the alternating current terminal and the relevant interlinking factor. The different potentials are, in particular, a positive and a negative potential, but can however also be a ground potential and a positive potential.

In some embodiments, the switches of the configuration device are semiconductor switches, MOSFETs for example. In some embodiments, the switches of the configuration device can however also be designed as electromechanical switches. The first switches and the at least one second switch are closed in alternation. While the first switches are closed, the at least one second switch is open. If the at least one second switch is closed, the first switches are opened.

In some embodiments, the charging circuit can comprise an additional diode circuit. The neutral conductor terminal is connected to different potentials of the rectifier through this. In other words, the neutral conductor terminal is connected to the direct voltage side of the rectifier via the additional diode circuit. The additional diode circuit can be designed similarly to the diode circuit referred to above and connected to the neutral conductor. In contrast to the diode circuit, the additional diode circuit is connected to the potentials of the rectifier (and not to connecting points within the configuration device).

In some embodiments, the configuration device is in the form of a series circuit whose ends are connected to the potentials at the direct voltage side of the rectifier. The diode circuit is connected to connecting points within the configuration device (and not to the ends), while the additional diode circuit is connected to the ends of the configuration device. The additional diode circuit can be a rectifier circuit. Its alternating current side is connected to the neutral conductor terminal, while its direct current side is connected to the potentials of the rectifier. The additional diode circuit can comprise at least two diodes that are connected to different potentials (of the direct current side) of the rectifier. The diodes of the additional diode circuit are connected (starting from the neutral conductor terminal) in different directions (in which the direction refers to the forward conduction direction or to the reverse bias direction of the diodes). The additional diode circuit has a connection point between the at least two diodes of the additional diode circuit. The neutral conductor terminal is connected to this connection point.

In the single-phase operation, when the neutral conductor is used as a return conductor (or forward conductor), the current-carrying capacity of the additional diode circuit supports the diode circuit. In some embodiments, when the switching elements of the configuration device are semiconductor elements, a forward conduction voltage is dropped across them. Since the additional diode circuit is connected to the potentials of the rectifier directly (and not via switching elements of the configuration device), the diodes of the additional diode circuit relieve the diodes of the diode circuit. As a result, when the neutral conductor is used as the return conductor, the diodes of the diode circuit do not have to carry the current, or only carry it partially, while the additional diode circuit implements the remaining part of the current transfer.

The term "additional diode circuit" refers to the diode circuit that is (directly) connected to the potentials of the direct current side of the rectifier, while the term "diode circuit" (without "additional") refers exclusively to the circuit that connects the neutral conductor terminal to the configuration device or to its intermediate points.

In some embodiments, the charging circuit comprises a control apparatus that is connected in a controlling manner to the configuration device. The configuration device is fitted with switches. The control apparatus is connected in a controlling manner to the switches. In a parallel configuration state (for the charging control device) the control apparatus is designed to close only the switch or switches of the configuration device via which the smoothing capacitors are each connected between two different potentials of the rectifier. In other words, the control apparatus is designed to close only the switch or switches of the configuration device which, when closed, connects the smoothing capacitors to one another in parallel (and thereby also connects to the two different potentials). In the parallel configuration state, each of the smoothing capacitors is separately connected between the two different potentials, and thus receives the full potential difference or voltage between the two different potentials.

In some embodiments, the control device is furthermore designed, in a series configuration state (of the control apparatus) to close only the switch or switches of the configuration device that connects or connect the smoothing capacitors to one another in series. The control apparatus is designed, in the parallel configuration state, to open the switch or switches that are closed in the series configuration state. The control apparatus is furthermore designed, in the series configuration state, to open the switch or switches that are closed in the parallel configuration state. The control apparatus is thus designed to close the switches that are responsible for the parallel configuration state and those switches that are responsible for the series configuration state in alternation (or to open all switches).

In some embodiments, the controller can be designed to ascertain a single-phase as well as a polyphase occupancy state of the alternating voltage terminal. The controller is alternatively designed to ascertain a single-phase and a polyphase usage state of the rectifier. The control apparatus is furthermore alternatively designed to acquire a signal that indicates a single-phase or a polyphase desired state of the charging circuit. The control apparatus is in other words designed to distinguish between a single-phase and a polyphase state (of the alternating current terminal or of the rectifier). The controller can furthermore be designed to connect the smoothing capacitors to one another in a parallel configuration in one of the single-phase states. The control apparatus is furthermore designed to connect the smoothing capacitors to one another in a series configuration in one of the polyphase states.

In some embodiments, the control apparatus can be designed, in the case of a rectified voltage that is present at the direct current side of the rectifier and that lies above a predefined threshold value, to connect the smoothing capacitors to one another in series (by means of the configuration device), and in the case of a voltage that does not lie above the threshold value, to connect the smoothing capacitors to one another in parallel (again by means of the configuration device). It is thereby possible, that even increased voltages that do not result from an increased interlinking factor (i.e. an interlinking factor>1), for the smoothing capacitors to be connected in series (in order thus to obtain only a part of the rectified voltage per capacitor). The control apparatus can therefore comprise a comparator that compares the rectified voltage of the rectifier to the threshold value. The threshold value preferably lies below a maximum voltage of the capacitors by a predefined margin determined by the design of the capacitor.

In some embodiments, the charging circuit comprises a plurality of direct voltage converters. These each comprise a clocked switching unit and an intermediate circuit capacitor. The intermediate circuit capacitor of a first of the direct voltage converters is formed by a first of the smoothing capacitors. The intermediate circuit capacitor of a second of the direct voltage converters is formed as a second of the smoothing capacitors. The smoothing capacitors are thereby used as intermediate circuit capacitors of different direct voltage converters. The smoothed switching unit comprises at least one controllable switch, in particular two controllable switches, wherein these switches serve for the alternating connection of an element. The direct voltage converter can, for example, comprise an inductor (or a capacitor) as a temporary storage element. Each direct voltage converter preferably comprises a converter inductor that is connected upstream or downstream of the clocked switching unit. The direct voltage converters can be designed as step-up, step-down or synchronous converters. The direct voltage converters may be constructed in the same manner.

The direct voltage converters comprise terminals that are connected to a direct current terminal. The direct current terminal is configured for connection of the energy store (to the charging circuit). The terminals of the direct voltage converters are here connected to one another in parallel. The direct voltage converters thus operate in parallel when charging, and the currents that are delivered are added together at the direct current terminal. A positive and a negative terminal are, for example, provided as terminals, wherein both of the direct voltage converters, or their positive potentials, are connected at the positive terminal. The same also applies to the negative terminal or for a ground terminal.

In some embodiments, the rectifier can be a controllable rectifier. The controllable rectifier can be connected directly to the alternating current terminal. The rectifier unit here comprises transistors, but not, however, any dedicated energy stores such as coils.

In some embodiments, the rectifier can be a power factor correction filter. This comprises a controllable rectifier unit that is connected via inductors (such as coils) to the alternating current terminal. The inductors here form temporary energy stores in the context of the power factor correction filter. Each phase of the alternating current terminal is connected to the rectifier unit via its own (series-connected) inductor.

In some embodiments, there is vehicle electrical system that comprises the charging circuit and an energy store that is connected to this via the direct current terminal of the charging circuit. If a direct voltage converter is not provided, then the direct current terminal (for connecting to the energy store) is joined directly to the direct voltage side of the rectifier, which means with the potentials between which the intermediate smoothing capacitors are located.

The FIG. shows one form of embodiment of a charging circuit that is connected to a (vehicle-side) energy store. The charging circuit LS shown therein comprises an alternating current terminal WA with three phase terminals L1 to L3, and with a neutral conductor terminal N. These are connected to an alternating current side of a rectifier GR. The rectifier GR comprises a rectifier unit GE with diodes, as well as three inductors I1 to I3 (with individual phases) connected upstream. The inductors I1 to I3 connect the alternating current terminal WA to the rectifier unit GE, and in particular connect the different phase terminals L1-L3 of the alternating current terminal to the rectifier unit GE. The rectifier unit GE only comprises rectifier elements in the form of diodes or, in particular, in the form of controllable transistors. The inductors I1 to I3 with individual phases connected upstream, together with the rectifier unit, form a power factor correction filter, which means a rectifier GR which, in addition to the rectifying function, also realizes functions such as harmonic damping and/or power factor correction and/or stepping up.

The rectifier GR comprises a direct current side GS that is opposite to the alternating current side. The rectifier GR thus connects the alternating current terminal WA to two individual ends of a pair of smoothing capacitors C1 and C2. A diode circuit DS is provided, comprising a first diode D1 and a second diode D2. These are connected to one another in series via a connecting point, wherein the neutral conductor terminal N is connected at the connecting point. Looking out from this connecting point, the diodes D1 and D2 are connected (in opposing forward conduction directions) to a configuration device KV.

The configuration device KV comprises a series circuit of two switches S1 and S3, as well as a switch S2. These switches are connected to one another in series. The resulting series circuit is connected to the direct current side of the rectifier GR. This series circuit of the switches S1 to S3 is in particular connected with one end to the positive potential P+ and the negative potential P−. The positive potential P+ and the negative potential P− are the direct voltage potentials of the rectifier GR or of the direct current side GS of the rectifier GR. The series circuit of the switches S1 to S3, and thereby the configuration device KV, is connected in parallel (with the ends of the configuration device KV) to the potentials P−, P+. The switch S2 connects the switches S1 and S3 to one another. The switches S1 and S3 are each permanently connected to one of the two potentials, wherein the switch S1 is connected to the positive potential P+ and the switch S3 is connected to the negative potential P−. The series circuit of the diodes D1 and D2 is connected in parallel with the switch S2, which is connected in series between the switches S1 and S3.

The diode circuit DS is in other words connected in parallel with the switch S2. The diode circuit D2 forms a diode bridge for full-wave rectification, in particular for single-phase operation. The connecting point of the diodes of the diode circuit DS is connected to the neutral conductor N.

The connecting point between the switch S1 and the switch S2 is connected to a first smoothing capacitor C1. The connecting point between the switches S2 and S3 is connected to the second smoothing capacitor C2. The smoothing capacitors C1 and C2 are thus only connected in series with one another when S2 is closed. If the switches S1 and S3 are closed, then the capacitors C1 and C2 are connected to one another in parallel.

If only one phase is thus connected, an interlinking factor of 1 results, and the capacitors C1 and C2 can be connected in parallel with one another to increase the capacitance. If the alternating current terminal WA is used with three phases (wherein the phase terminals L1 to L3 are connected to different phases of a three-phase current system), an interlinking factor>1 results, and the capacitors C1 and C2 are connected in series by the configuration device KV. As a result (due to the voltage division of the capacitors) only half of the smoothed voltage is developed across each of the capacitors C1 and C2. Each of the capacitors C1 and C2 can thereby be dimensioned with a lower rated voltage than the maximum voltage in three-phase operation. The smoothing capacitors preferably have the same (nominal) capacitance and/or the same rated voltage.

In single-phase operation, the neutral conductor N can be connected to a corresponding terminal of the three-phase system, while the phase terminals L1 to L3, or only the phase terminal L2 (or also only the phase terminal L1 and L2) are connected to one and the same phase of the connectable network. An interlinking factor of 1 results in this case. When more than one phase terminal L1 to L3 is connected to the same phase of a connectable alternating current network, the relevant terminals L1, L2, L3 are accordingly connected to one another. Since no phase currents that are offset in phase with respect to one another are used, or no phase terminals with phase offset are connected, this is also referred to as single-phase operation. In single-phase operation, the terminals L1, L2 and L3 are preferably connected to the same phase (i.e. connected to one another), so that all the phases of the rectifier GR can contribute to the flow of current.

In some embodiments, the smoothing capacitors C1 and C2 or the direct voltage side of the rectifier GR are/is connected directly to the energy store ES, the direct current terminal GA of the charging circuit LS. The energy store ES here is not necessarily part of the charging circuit but can be a further component of the vehicle electrical network in which the charging circuit is provided.

In the example illustrated, a direct voltage converter unit WE that comprises two direct voltage converters GW1, GW2, is provided. Each of the voltage converters GW1, GW2 comprises a switching unit SE1, SE2. Clocked switching elements of the direct voltage converter are provided in these as well as a temporary energy store (here illustrated symbolically) such as a coil. The intermediate circuit capacitors belonging to the direct voltage converter are realized by the capacitors C1 and C2. The first direct voltage converter GW is thus formed from the capacitor C1 as an intermediate circuit capacitor and the switching unit SE1. The direct voltage converter GW2 is correspondingly formed from the switching unit SE2 and the capacitor C2.

A control apparatus C is connected in a controlling manner to the switches S1 to S3. The control apparatus C can furthermore comprise an input at which the control apparatus can acquire signals relating to the number of active (different) phases of the rectifier GR. These can be signals that represent the occupancy status of the alternating current terminal, that represent the number of active and phase-offset phases of the rectifiers GR, or that represent a command to carry out a single-phase or polyphase operation, wherein the last-mentioned signal states the number of the (different) phases. In a further form of embodiment, the control apparatus C is designed to acquire the voltage at the direct current side of the rectifier and from that to deduce whether the voltage is greater than a threshold value, in order in this case to provide the configuration device KV for series operation (of the capacitors C1 and C2). If the voltage is lower than the threshold value, the configuration device is set to parallel interconnection of these capacitors in order to increase the total capacitance of the capacitors C1 and C2.

The direct voltage converter unit WE is only shown schematically. The direct voltage converters GW1, GW2 or switching units SE1, SE2, that are present there are connected in parallel with one another at the output, which means at the side of the direct current terminal GA. A series connection of the converter is, however, also conceivable. Galvanically conductive or galvanically isolating or insulating converters can be provided as the converters GW1, GW2. This depends, in particular, on the interconnection at the side of the direct current terminal GA.

An additional diode circuit Z with the diodes D3 and D4 enables support for the diode circuit DS when the configuration device KV is in the parallel state. The diodes D3 and D4 are connected to one another in series, wherein the resulting connection point is connected to the neutral conductor N. The connecting point between the diodes D3 and D4 is connected to the connecting point between the diodes D1 and D2. The diodes D3 and D4 are furthermore connected to the direct current side of the rectifier GR. The diode D3 connects the neutral conductor terminal N to the positive potential P+. The diode D4 connects the neutral conductor terminal N to the negative potential P−. The diodes D3 and D4 (like the diodes D1 and D2 also) are connected in the reverse bias direction with respect to the potentials P− and P+.

It should finally be noted that the FIG. can be viewed as the vehicle electrical network that comprises the charging circuit LS and the energy store ES connected thereto. The energy store ES can be an accumulator, in particular a lithium-based accumulator. The energy store ES may be a traction accumulator. The charging circuit is designed in particular for a power of at least 1 kW, 5 kW, 10 kW or 50 kW. This relates to the power when connected to a three-phase system.

What is claimed is:

1. A charging circuit for a vehicle-side electrical energy store, the charging circuit comprising:
   an alternating current terminal;
   at least two smoothing capacitors;
   a configuration device; and
   a rectifier via which the alternating current terminal is connected to the configuration device;
   wherein the configuration device connects the rectifier to the at least two smoothing capacitors, and is configured to connect the smoothing capacitors to one another in a first parallel arrangement and a second series arrangement;
   wherein the alternating current terminal comprises a neutral conductor terminal connected via a diode circuit to the configuration device.

2. The charging circuit as claimed in claim 1, wherein the diode circuit comprises a rectifier circuit with an alternating current side connected to the neutral conductor terminal and a direct current side connected to the configuration device.

3. The charging circuit as claimed in claim 1, wherein:
   the diode circuit comprises at least two diodes;
   a first diode of the at least two diodes connects the neutral conductor terminal to one of the smoothing capacitors; and
   a second diode connects the neutral conductor terminal to a different one of the smoothing capacitors.

4. The charging circuit as claimed in claim 1, wherein the configuration device comprises:
   a first switch with a closed position connecting the at least two smoothing capacitors to one another in parallel; and
   a second switch with a closed position connecting the at least two smoothing capacitors to one another in series.

5. The charging circuit as claimed in claim 4, wherein:
   the configuration device comprises two first switches; and
   the second switch is connected to the two first switches in a series circuit connected to different potentials of the rectifier; and
   the two first switches are connected to one another within the series circuit via the second switch.

6. The charging circuit as claimed in claim 1, further comprising an additional diode circuit connecting the neutral conductor terminal to different potentials of the rectifier.

7. The charging circuit as claimed in claim 1, further comprising a control apparatus connected to the configuration device;
   wherein the configuration device is fitted with switches; and
   the control apparatus is designed to:
   (i) in a parallel configuration state, close only the switch or switches of the configuration device via which the two smoothing capacitors are each connected between two different potentials of the rectifier; and
   (ii) in a series configuration state, close only the switch or switches of the configuration device that connect the two smoothing capacitors in series.

8. The charging circuit as claimed in claim 7, wherein the control apparatus is programmed to:
   ascertain a single-phase and a polyphase occupancy state of the alternating current terminal;
   ascertain a single-phase as well as a polyphase usage state of the rectifier; or
   acquire a signal that indicates a single-phase or polyphase desired state of the charging circuit;
   wherein the control apparatus connects the two smoothing capacitors to one another in a parallel configuration in the single-phase states and connects them to one another in a series configuration in the polyphase states.

9. The charging circuit as claimed in claim 1, wherein further comprising a plurality of direct voltage converters, each comprising a clocked switching unit and an intermediate circuit capacitor;
   wherein the intermediate circuit capacitor of a first of the plurality of direct voltage converters includes a first of the two smoothing capacitors; and
   the intermediate circuit capacitor of a second of the plurality of direct voltage converters includes a second of the smoothing capacitors.

10. The charging circuit as claimed in claim 9, wherein:
    each of the plurality of direct voltage converters comprises terminals connected to a direct current terminal for connection of the energy store;
    the terminals of each of the plurality of direct voltage converters are connected to one another in parallel.

11. The charging circuit as claimed in claim 1, wherein:
    the rectifier comprises a controllable rectifier with a controllable rectifier unit connected directly to the alternating current terminal; or
    the rectifier comprises a power factor correction filter with a controllable rectifier unit connected via inductors to the alternating current terminal.

* * * * *